(12) United States Patent
Narasimhan et al.

(10) Patent No.: US 8,422,939 B2
(45) Date of Patent: *Apr. 16, 2013

(54) EFFICIENT MULTICAST CONTROL PROCESSING FOR A WIRELESS NETWORK

(75) Inventors: Partha Narasimhan, Saratoga, CA (US); Merwyn Andrade, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,507

(22) Filed: Jun. 7, 2012

(65) Prior Publication Data

US 2012/0243457 A1 Sep. 27, 2012

Related U.S. Application Data

(63) Continuation of application No. 11/449,964, filed on Jun. 9, 2006, now Pat. No. 8,199,732.

(51) Int. Cl.
*H04H 20/71* (2008.01)

(52) U.S. Cl.
USPC ...... 455/3.01; 455/67.11; 455/67.7; 370/338; 370/270; 370/390; 375/257

(58) Field of Classification Search .................. 370/331, 370/338, 312, 443, 401, 390; 455/3.01, 518, 455/426.1, 11.1, 502, 520, 458; 340/7.23; 714/748

See application file for complete search history.

(56) References Cited

U.S. PATENT DOCUMENTS

| | | | |
|---|---|---|---|
| 6,081,715 A * | 6/2000 | La Porta et al. | 455/445 |
| 6,085,101 A * | 7/2000 | Jain et al. | 455/500 |
| 6,230,205 B1 * | 5/2001 | Garrity et al. | 709/231 |
| 7,424,283 B1 * | 9/2008 | Mangal | 455/406 |
| 8,059,572 B2 * | 11/2011 | Kim et al. | 370/312 |
| 8,194,599 B2 * | 6/2012 | Marinier et al. | 370/329 |
| 8,199,732 B2 | 6/2012 | Narasimhan et al. | |
| 2003/0058827 A1 * | 3/2003 | Chow et al. | 370/338 |
| 2005/0201342 A1 * | 9/2005 | Wilkinson et al. | 370/338 |
| 2006/0007930 A1 | 1/2006 | Dorenbosch | |
| 2006/0034281 A1 * | 2/2006 | Cain et al. | 370/390 |
| 2006/0072532 A1 * | 4/2006 | Dorenbosch et al. | 370/342 |
| 2007/0086458 A1 * | 4/2007 | Narayanan et al. | 370/390 |
| 2007/0189249 A1 * | 8/2007 | Gurevich et al. | 370/338 |
| 2007/0217432 A1 * | 9/2007 | Molisch et al. | 370/400 |
| 2008/0239957 A1 * | 10/2008 | Tokura et al. | 370/235 |

OTHER PUBLICATIONS

U.S. Appl. No. 11/449,964, Non-Final Office Action, mailed Dec. 1, 2009.
U.S. Appl. No. 11/449,964, Final Office Action, mailed Jun. 9, 2010.
U.S. Appl. No. 11/449,964, Non-Final Office Action, mailed Dec. 22, 2010.
U.S. Appl. No. 11/449,964, Non-Final Office Action, mailed Jun. 9, 2011.
U.S. Appl. No. 11/449,964, Notice of Allowance, mailed Feb. 17, 2012.
J. Wang, R Sinnarajah, T. Chen, Y. Wei, E. Tiedemann; Broadcast and Multicast Services in cdma2000; Feb. 2004; IEEE Communications Magazine; pp. 76-82.

* cited by examiner

*Primary Examiner* — Mahendra Patel
(74) *Attorney, Agent, or Firm* — Blakely, Sokoloff, Taylor & Zafman LLP

(57) ABSTRACT

According to one embodiment of the invention, a method comprises detecting, by a wireless network switch, a new association between an access point and a wireless station. Thereafter, a first message is transmitted from the wireless network switch. The first message is adapted to cause the access point to (i) join a multicast group to which the wireless station is a member and (ii) transmit a multicast message directly to a multicast router without routing the multicast message via the wireless network switch.

26 Claims, 8 Drawing Sheets

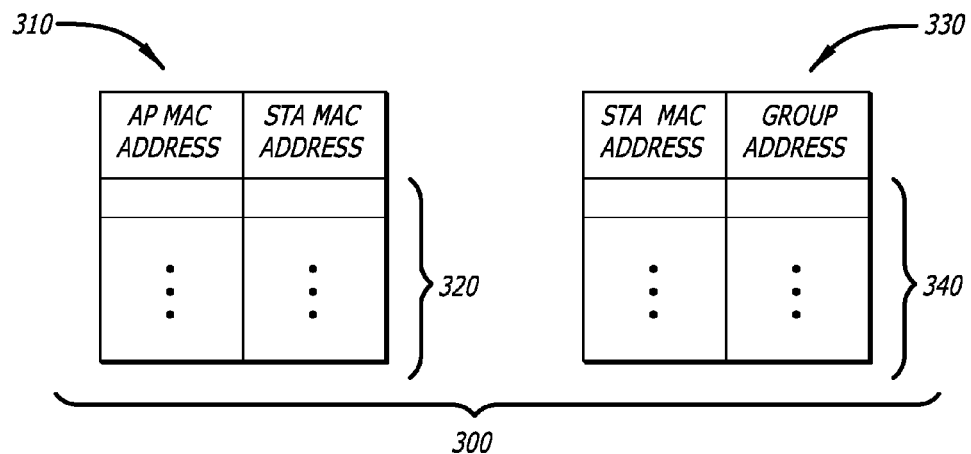
FIG. 3A
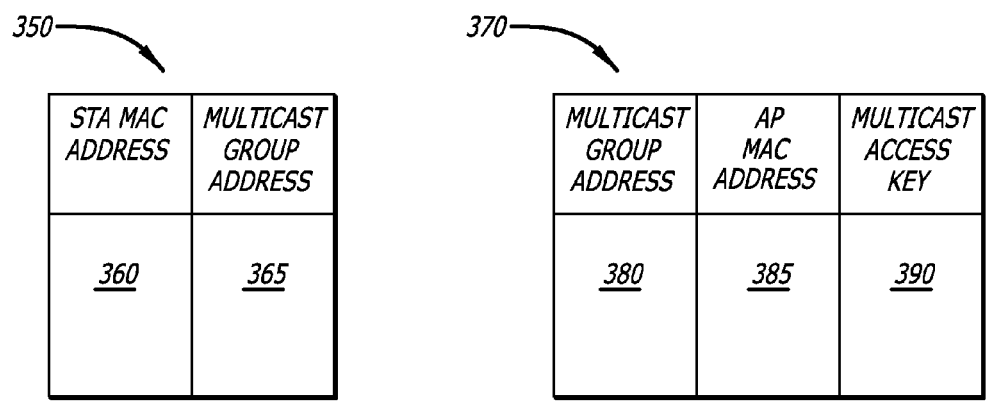
FIG. 3B
FIG. 3C

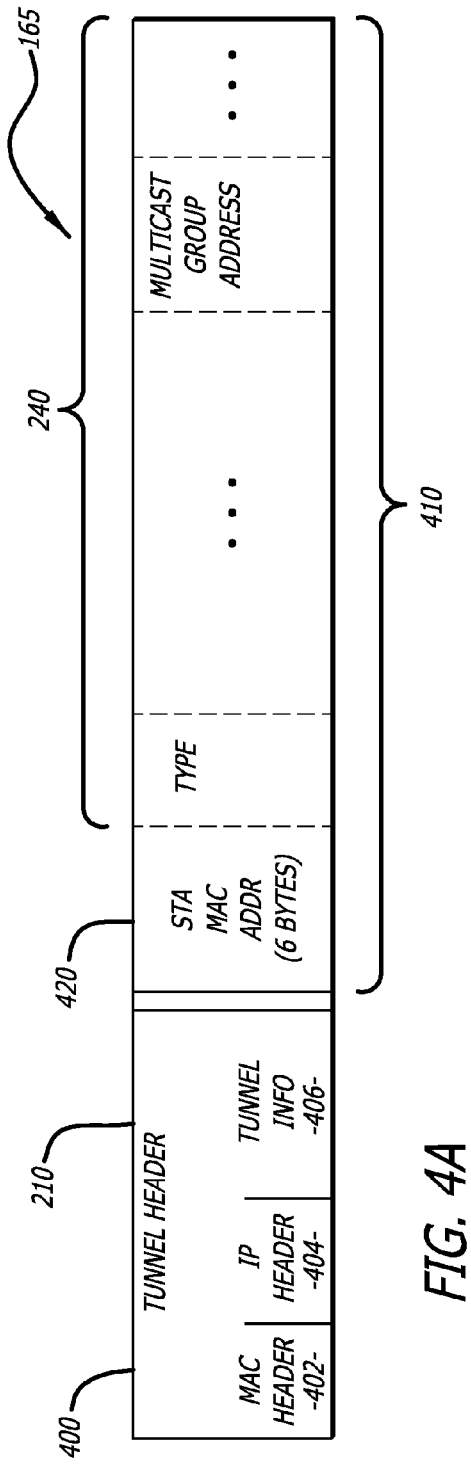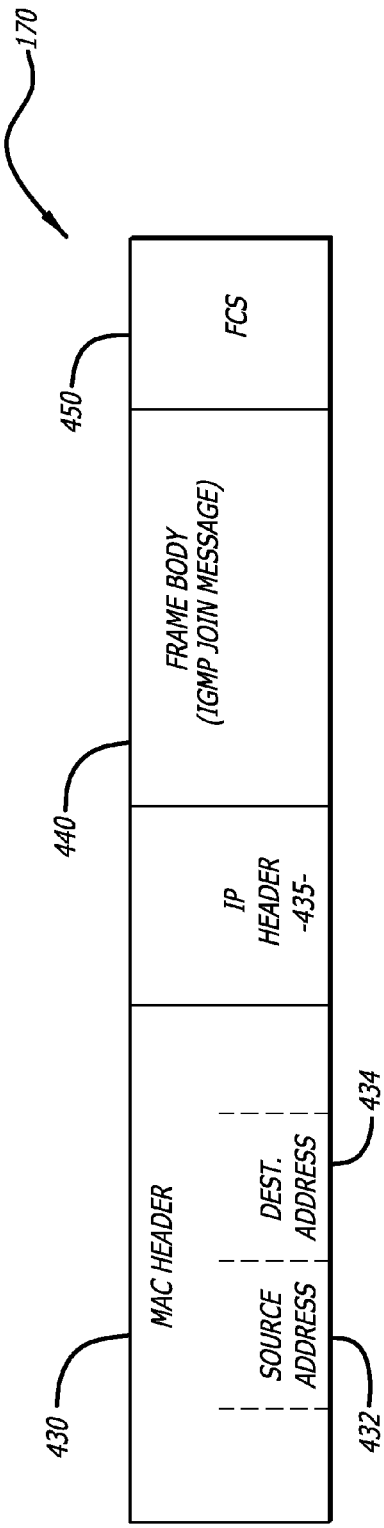
FIG. 4A
FIG. 4B

US 8,422,939 B2

EFFICIENT MULTICAST CONTROL PROCESSING FOR A WIRELESS NETWORK

CROSS-REFERENCE TO RELATED APPLICATIONS

This application is a continuation of U.S. patent application Ser. No. 11/449,964 filed Jun. 9, 2006, now U.S. Pat. No. 8,199,732, the entire contents of which are incorporated by reference.

FIELD

Embodiments of the invention relate to the field of communications, and in particular, to a network and method for offloading multicast data processing from a wireless network switch so that the wireless network switch handles multicast control processing while one or more wired network devices handles multicast data processing.

GENERAL BACKGROUND

Over the last decade or so, many companies have installed networks with one or more local area networks in order to allow their employees access to various network resources. To improve efficiency, enhancements have been added to local area networks such as wireless access. Based on this enhancement, wireless local area networks (WLANs) have been and continue to be utilized by more and more companies.

Typically, a WLAN supports communications between a number of wireless devices (e.g., wireless stations "STAs") without any required line of sight for such communications. In current network configurations, multiple Access Points (APs) are coupled to a wired network, such as an Ethernet network for example, and each AP operates as a relay station by supporting communications between resources of the wired network and the STAs. Data communications can be performed in accordance with a unicast, broadcast or multicast transmission scheme.

A multicast transmission scheme involves the distribution of packets to selected groups of wireless devices within the WLAN. These multicast groups can change dynamically, where the wireless devices may decide to join or leave a multicast group at any time, and may be a member of more than one multicast group.

Normally, to join a multicast group, a STA initiates a request to be included in a multicast session as a member of the multicast group. The request is performed in accordance with Internet Group Management Protocol (IGMP). IGMP is a communication protocol used to manage the membership of Internet Protocol (IP) multicast groups. More specifically, in accordance with the IGMP protocol, the STA informs a multicast router that it wants to receive transmissions directed to a particular multicast group (IGMP JOIN message) or that it no longer wants to receive messages directed to that multicast group (IGMP LEAVE message).

Currently, multicast communications are not efficiently supported by WLANs, especially centralized WLANs where multicast data streams are routed through a wireless network switch. Since multicast data streams are routed through the wireless network switch, this switch is currently responsible for replicating multicast data streams, and where applicable, encrypting such data streams with multicast keys. Replication at the wireless network switch is performed by software, which may cause unacceptably high transmission delays when supporting an increasing number of wireless stations.

As a result, there is a desire to alter the operations of a WLAN, especially centralized WLANs, so that most or all of the multicast data processing is handled by device(s) other than the centralized wireless network switch.

BRIEF DESCRIPTION OF THE DRAWINGS

The invention may best be understood by referring to the following description and accompanying drawings that are used to illustrate embodiments of the invention.

FIG. 3A is an exemplary embodiment of storage data structures maintained by a wireless network switch to control multicast operations of the WLAN of FIG. 1.

FIG. 3B is an exemplary embodiment of a storage data structure maintained by an access point of the WLAN of FIG. 1 in order to route messages to a local router over the wired network.

FIG. 3C is an exemplary embodiment of a storage data structure maintained by the local router to support multicast data processing for the WLAN of FIG. 1.

FIG. 4A is an exemplary embodiment of a PROXY IGMP JOIN message from the wireless network switch to the local router.

FIG. 4B is an exemplary embodiment of a multicast message from the AP to the multicast router.

DETAILED DESCRIPTION

Figure 1:
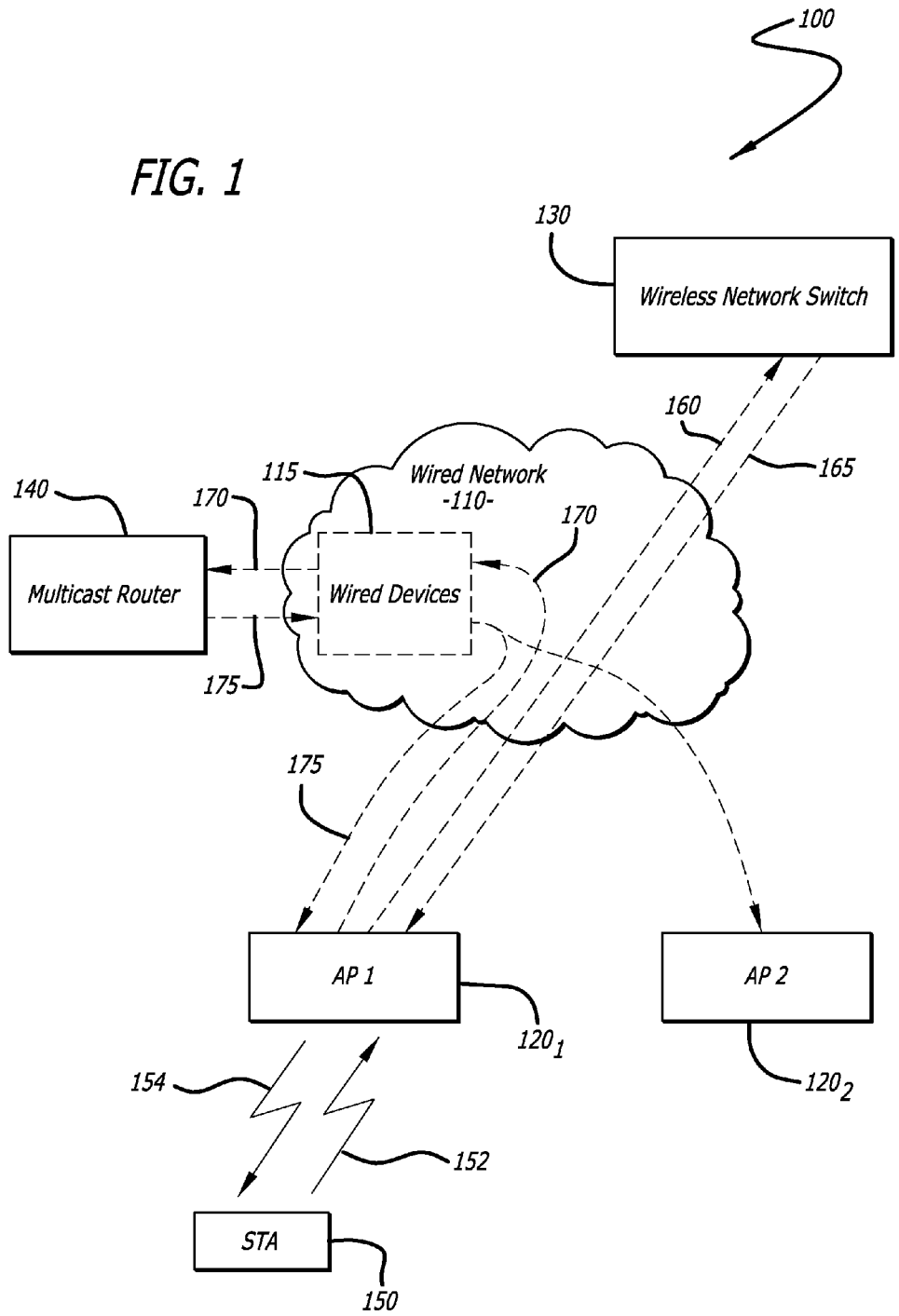
FIG. 1 is an exemplary embodiment of a centralized wireless local area network in accordance with an embodiment of the invention.

Embodiments of the invention relate to a network and method for partial or complete offloading of multicast data processing by a wireless network switch. According to one embodiment of the invention, the network is configured as a centralized wireless local area network (WLAN). Terminating the data path, the wireless network switch handles multicast control, but this switch does not participate in multicast data processing. Hence, multicast data streams are directly routed from a wired network device (e.g., a multicast router) to one or more targeted Access Points (APs) without propagation through the wireless network switch. Unicast data streams, however, may be routed from the wired network device to the AP(s) via the wireless network switch.

As an alternative embodiment of the invention, the wireless network switch for the WLAN handles multicast control, but participates in multicast data processing for only some of the wireless devices. As an illustrative example, the wireless network switch may perform multicast data processing for wireless devices in communication with a first AP of the WLAN, but avoids such multicast data processing for wireless devices in communication with a second AP.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, a "wireless network switch" generally includes hardware and/or software adapted to communicate with one or more wireless devices that form part of a wireless network via an AP. Examples of a wireless network switch may include, but is not limited or restricted to a wireless local area network (WLAN) switch such as the ARUBA™ 6000 mobility controller, the ARUBA™ 5000 mobility controller and the like.

Software is generally considered to be executable code such as an application, an applet, a routine or even one or more executable instructions stored in a storage medium. Firmware is considered merely one type of software. The "storage medium" may include, but is not limited or restricted to a programmable electronic circuit, a semiconductor memory device, a volatile memory (e.g., random access memory, etc.), a non-volatile memory (e.g., read-only memory, flash memory, a hard drive, etc.), a portable memory device (e.g., floppy diskette, a compact disk "CD", digital versatile disc "DVD", a digital tape, a Universal Serial Bus "USB" flash drive), or the like.

A "message" is information arranged in a selected format that is transmitted over a communication link, namely a wired or wireless pathway for information. One type of message is a "multicast message" that includes information either involved in the formulation of a transmission path for multicast data to more than one destination device belonging to a particular group of devices or involved in the multicast transmission. According to one embodiment of the invention, one type of multicast message is an IGMP JOIN message that is transmitted from a STA and directed to the wireless network switch. Another type of multicast message is a PROXY IGMP JOIN message that is transmitted from the wireless network switch to the AP. Yet other types of multicast messages are a multicast message to transmit IGMP JOIN packet from the AP to the multicast router and a multicast data stream transmitted from the multicast router to one or more targeted APs.

Referring to FIG. 1, an exemplary embodiment of a wireless local area network (WLAN) 100 is shown. In accordance with one embodiment of the invention, WLAN 100 comprises a wired network 110 operating as an Open Source Interconnect (OSI) Layer 2/Layer 3 (L2/L3) network. Wired network 110 supports communications between a plurality of access points (APs) such as APs $120_1$ and $120_2$, a wireless network switch 130 and a router 140.

According to one embodiment of the invention, wired devices 115 (e.g., L2 switches) within wired network 110 may perform replication of multicast transmissions. This occurs when APs $120_1$ and $120_2$ are in communication with router 140 via wired devices 115 and both are in communication with a STA being part of the multicast group. The wired devices 115 are represented by dashed lines to illustrate as an optional feature. Alternatively, router 140 may perform such replication where APs $120_1$ and $120_2$ are directly connected to router 140.

AP $120_1$ provides wireless communications with one or more wireless stations (STA) 150. According to one embodiment of the invention, STA 150 constitutes any wireless communication device that processes information (e.g., portable computer, personal digital assistant "PDA", Voice-over-IP "VoIP" telephone, etc.).

As shown in detail, after association and establishing a communication link with STA 150, a first AP $120_1$ receives a wireless message 152 from STA 150 and produces a wired message 160 to wireless network switch 130. According to one embodiment of the invention, wireless message 152 is a request by STA 150 to join as a member of a particular multicast group (hereinafter referred to as an "IGMP JOIN message"). IGMP JOIN message 152 can be generated at any time after association. Wired message 160 encapsulates IGMP JOIN message 152 for subsequent recovery at wireless network switch 130.

Figure 2:
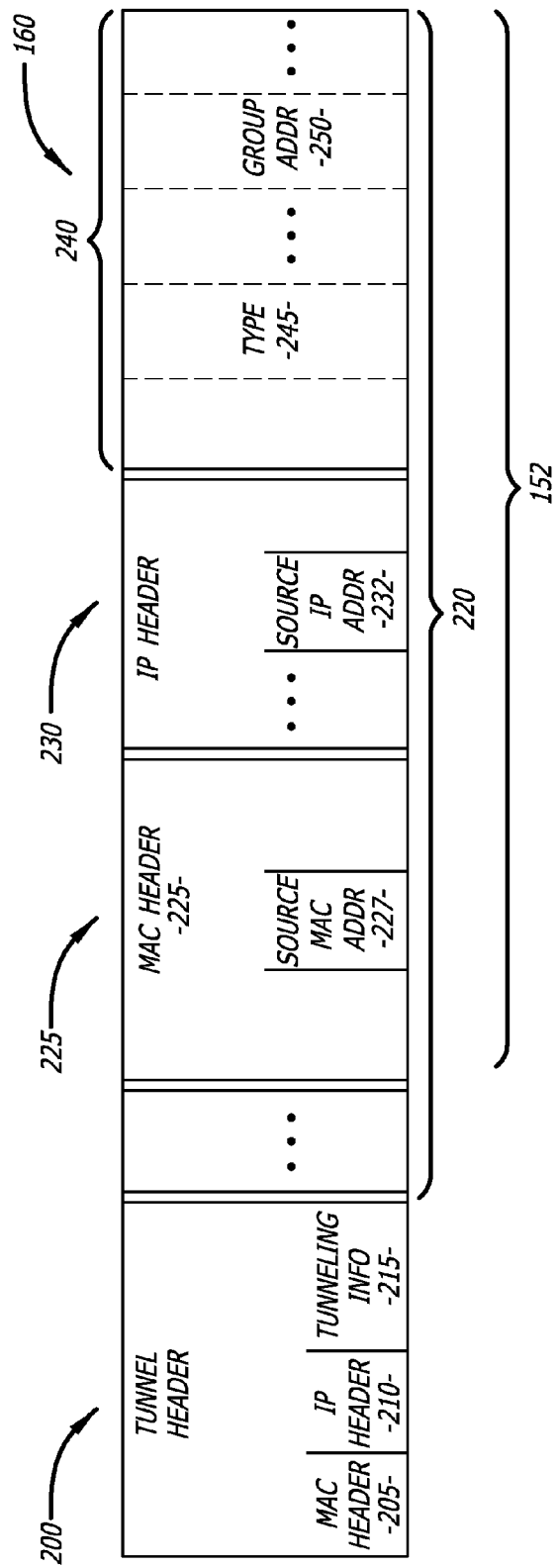
FIG. 2 is an exemplary embodiment of an Internet Group Management Protocol (IGMP) JOIN message transmitted by a wireless station to an access point (AP) in order to request joining a multicast group.

Referring to FIG. 2, wired message 160 includes a tunnel header 200 along with the encapsulated IGMP JOIN message 152 that is placed in payload 220. As shown, tunnel header 200 comprises a Media Access Control (MAC) header 205, an IP header 210 and tunneling specific information 215.

According to one embodiment of the invention, MAC header 205 comprises a source MAC address (e.g., MAC address of AP $120_1$) and a destination MAC address (e.g., MAC address of wireless network switch 130). It is contemplated that one of the MAC addresses may be used to identify an intermediary node if AP $120_1$ and switch 130 are on different L3 subnets. IP header 210 includes a destination IP address and a source IP address, being the IP address of wireless network switch 130 and AP $120_1$, respectively. Tunneling specific information 215 includes information that may be used to establish and maintain a direct communications between AP $120_1$ and wireless network switch 130 in accordance with Generic Routing Encapsulation (GRE), Internet Protocol Security (IPSec), CAPWAP or any other tunneling protocol.

IGMP JOIN message 152 comprises a Media Access Control "MAC" header 225, an Internet Protocol "IP" header 230 and an IGMP JOIN packet 240. MAC header 220 constitutes a Layer 2 (L2) header, which includes a source MAC address having stored therein a MAC address for STA 150 (hereinafter referred to as "STA MAC address" 227). Similarly, IP header 230 constitutes a Layer 3 (L3) header and includes a source IP address of STA 150 (hereinafter referred to as "STA IP address" 232).

IGMP JOIN packet 240 includes a plurality of fields, including a Type field 245 and a [Multicast] Group Address field 250. Type field 245 identifies a type of message, which is set to a first value to denote a JOIN [group] request or to a second value to denote a LEAVE [group] request. Group Address field 250 contains a unique address assigned to the desired multicast group that is identified by a "Multicast Group ID". The assignment of the unique address may occur during creation of the multicast group.

Wireless network switch 130 detects message 160 placed on wired network 110 by first AP $120_1$ and recovers information from this message. For instance, as shown in FIG. 2, STA MAC address 222 denoting the originating node of IGMP JOIN message 152 (e.g., STA 150) may be extracted from MAC header 220. Also, Group address 250 denoting the multicast address may be extracted from IGMP JOIN packet 240.

Referring now to FIG. 3A, an exemplary embodiment of storage data structure maintained by wireless network switch 130 to control multicast operations of WLAN 100 of FIG. 1 is shown. According to one embodiment of the invention, data structure 300 comprises a pair of tables 310 and 330, although other types of data structures besides tables may be used. A first table 310 includes a plurality of entries 320, each entry adapted to store one or more STA addresses forming part of the WLAN (referred to as "STA MAC address") and a corresponding MAC address of an AP associated with the STA(s) (referred to as "AP MAC address"). These entries are arranged to provide information as to the wireless connectivity between the STAs and APs forming the WLAN. For instance, information may be extracted that lists all STAs that are associated with a particular AP.

A second table 330 also includes a plurality of entries 340, each entry adapted to store an address of a STA, such as the STA MAC address for example, and one or more multicast group addresses of which the corresponding STA is a member. Second table 330 enables wireless network switch 130 of FIG. 1 to determine when an IGMP LEAVE message is appropriate.

Similar to second table 330, first AP $120_1$ comprises a storage data structure 350 used for routing messages to router 140 over wired network 110. As shown in FIG. 3B, storage data structure 350 may be configured, according to one embodiment of the invention, as a table including STA MAC address 360 and its corresponding multicast group address or addresses 365. Upon detecting a multicast data stream on wired network 110 targeted for first AP $120_1$, first AP $120_1$ determines the multicast group(s) associated with the data stream. Thereafter, first AP $120_1$ accesses storage data structure 350 to determine which STAs, if any, are members of the particular multicast group. If so, first AP $120_1$ transmits the multicast data stream onto the wireless communication link without any expectation of an acknowledgement that the receiving STA(s) received the multicast data stream.

Referring to FIG. 3C, an exemplary embodiment of a storage data structure maintained by router 140 to support multicast data processing for WLAN 100 of FIG. 1 is shown. According to one embodiment of the invention, storage data structure 370 is configured as a table that includes a plurality of entries with the following parameters: a Multicast Group address 380, an address for the AP (e.g., AP MAC address) 385 and an Multicast Access key 390. Of course, storage data structure 370 is not limited or restricted to these particular parameters or this table layout, but may include some or all of these parameters as well as other parameters.

Herein, Multicast Group address 380 is a parameter that identifies a multicast group while AP MAC address 385 is a parameter that is used to identify an AP. Collectively, these parameters identify one or more multicast groups that correspond to an AP, as identified by AP MAC address 385, which operates as a proxy for its STAs. In other words, the AP MAC address 385 identifies the AP that is associated with STAs that are members of a particular multicast group.

As an optional parameter, Multicast Access key 390 is the encryption key used to protect content that is transmitted from router 140 to wireless devices that are members of the corresponding multicast group. Multicast Access key 390 is produced and assigned to the AP during security association.

Of course, storage data structure 300, 350 and 370 are illustrated as tables. However, it is contemplated that these data structures 300, 350 and 370 are not limited or restricted to tables, but rather, they may be configured as any data storage mechanism. Moreover, some or all of these tables may be stored in a centralized location or in a decentralized manner as described above.

Referring back to FIG. 1, upon receipt of message 160, wireless network switch 130 returns a PROXY IGMP JOIN message 165 to first AP $120_1$. PROXY IGMP JOIN message 165 is configured to provide first AP $120_1$ with suitable information to send an IGMP JOIN message to router 140 without necessarily propagating through wireless switch 130.

Referring now to FIG. 4A, an exemplary embodiment of PROXY IGMP JOIN message 165 that is transferred from first AP $120_1$ to router 140 is shown. PROXY IGMP JOIN message 165 comprises a tunnel header 400 and a payload 410. Including a MAC header 402, IP header 404 and tunnel specific information 406. Tunnel header 400 is consistent with tunnel header 200 of FIG. 2 except for the switching of destination and source addresses.

Payload 410 includes IGMP JOIN packet 240 and at least one additional entry 420 being an address of STA 150 on whose behalf AP $120_1$ is joining the multicast group. The address is the MAC address of STA 150, which is used for storing and/or confirming the storage of information concerning which STAs are members of certain multicast groups. Such information is stored within storage data structure 350 of FIG. 3B.

Thereafter, as shown in FIG. 4B, AP $120_1$ produces a multicast message 170 that is formatted as a multicast Ethernet frame. Multicast message 170 comprises a MAC header 430, an IP header 435, a frame body 440 and a frame check sequence (FCS) 450 as shown in FIGS. 1 and 4B. More specifically, according to one embodiment of the invention, MAC header 430 comprises a source address 432 and destination address 434. Source address 432 is loaded with the AP MAC address for first AP $120_1$ while destination address 434 is loaded with the multicast group address corresponding to the multicast group ID. IP header 435 includes IP addresses of AP $120_1$ and multicast router 140.

Frame body 440 includes the original contents of IGMP JOIN packet 240, which includes the multicast group address 250 of FIG. 2 but excludes the STA MAC address 410 of FIG. 4A. The multicast group address can be extracted from frame body 440. FCS 450 is provided to ensure that the transmission is successfully received intact.

Returning back to FIG. 1, upon receipt of the multicast message 170, router 140 recovers the AP MAC address from MAC header 430 of FIG. 4B and, if needed, places the AP MAC address into an entry in AP address field 390 of data structure 370 of FIG. 3C. Router 140 further recovers the multicast group address from frame body 440 of multicast message 170 and stores such information in Multicast Group Address field 380 of FIG. 3C that corresponds to the AP MAC address identified in the MAC header 430. The access key associated with that multicast group is loaded into a corresponding Multicast Access key field 390.

Thereafter, upon transmission of multicast data streams 175, the data streams are associated with particular multicast groups are sent to the AP associated with a particular AP MAC address 385. Replication may occur at router 140 or at intermediary wired devices 115 within wired network 110 as described above.

Figure 5:
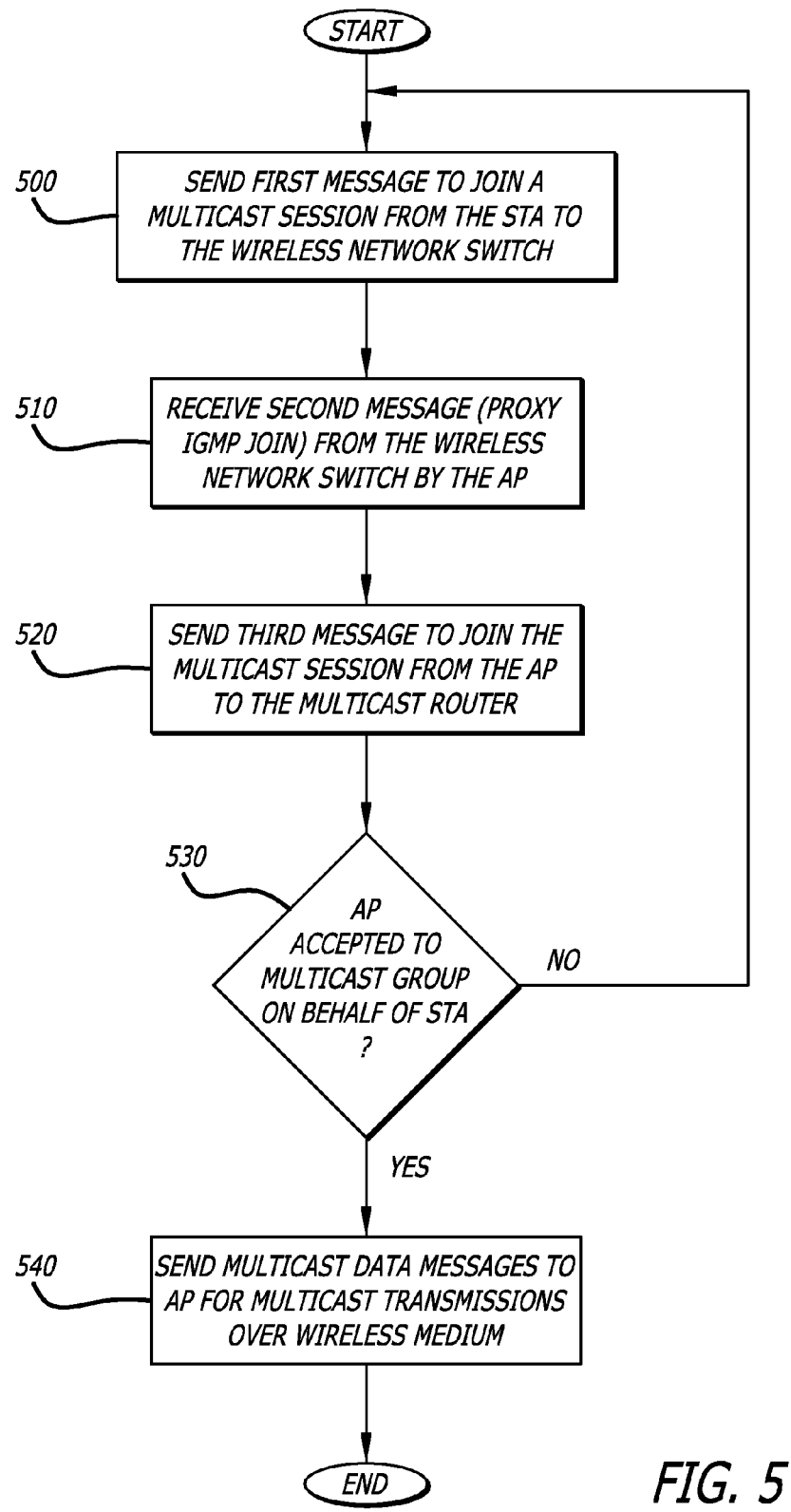
FIG. 5 is an exemplary flowchart illustrating the operations performed by an AP based on multicast control by the wireless network device and multicast data processing by the multicast router.

Referring to FIG. 5, an exemplary flow chart illustrating the operations performed by an access point (AP), such as first access point $120_1$ of FIG. 1, is shown. Multicast control is conducted by wireless network switch 130 and router 140 of FIG. 1 conducts multicast data processing.

Initially, as shown in block 500, a first message (e.g., IGMP JOIN message) is sent to join a multicast session. Originating from a station (STA), the first message is received by the AP and formatted appropriately before transmission to the wireless network switch. After analysis of the first message, the AP receives a second message (e.g., PROXY IGMP JOIN message) from the wireless network switch (block 510). In response to receipt of the second message, the AP sends a third message to the multicast router to join a multicast session on behalf of the STA and to ensure that the data path for multicast data streams targeted for the AP avoid routing through wireless network switch (block 520). The third message may be configured as an Ethernet message or any message format associated with a wired network.

Thereafter, as a result of the third message reaching the multicast router, the multicast router starts forwarding packets on its port on which it received the third message. Moreover, every intermediary node along the transmission path would record similar information from the third message (e.g., port on which the third message was received) so that these nodes can start forwarding packets belonging to that session on the appropriate port as set forth in blocks 530 and 540. In the event that the AP (on behalf of the STA) is not accepted as a member of the multicast group, a timeout will occur, which prompts the STA to retransmit the IGMP JOIN message.

Figure 6:
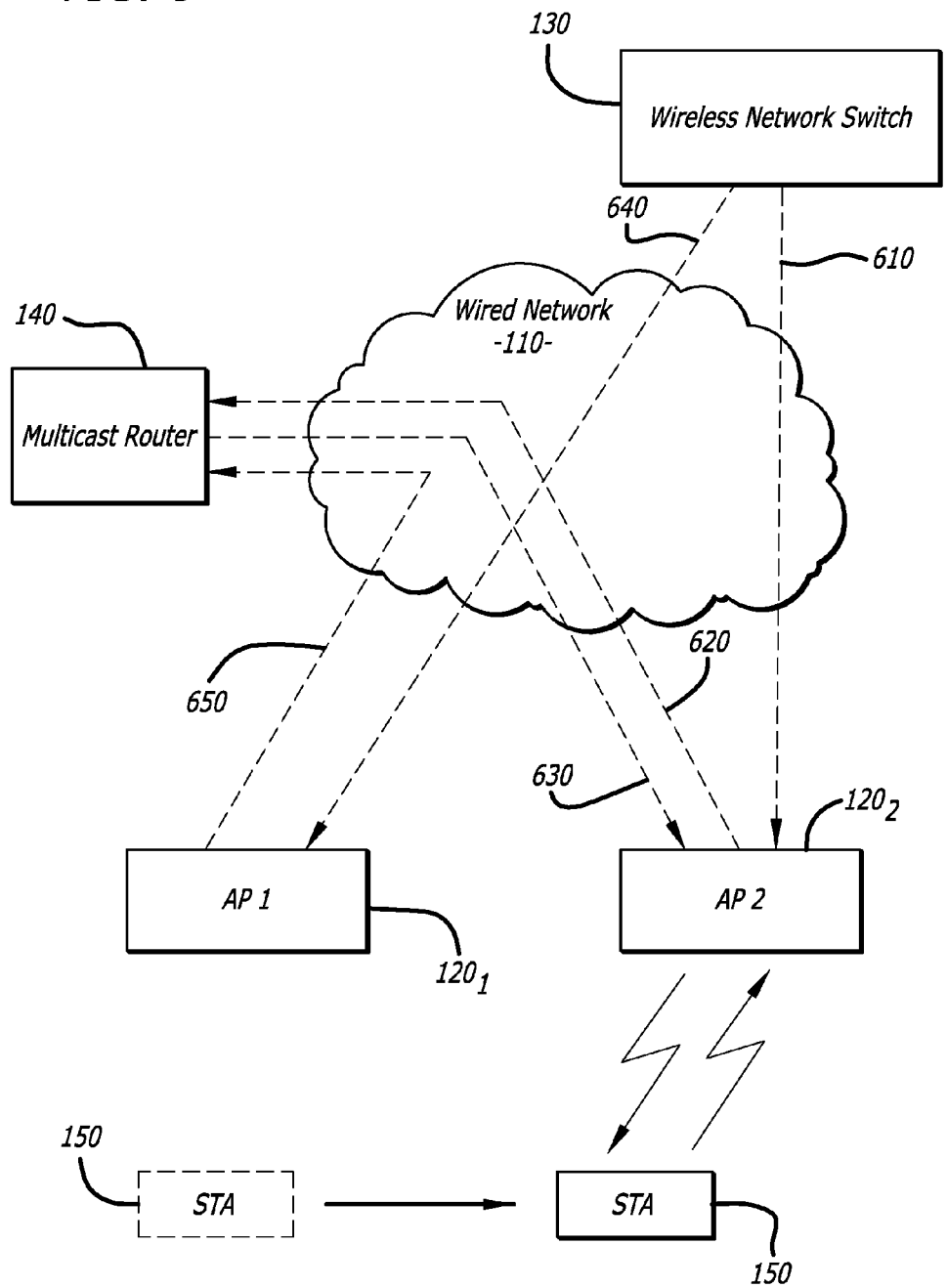
FIG. 6 is an exemplary embodiment of a centralized wireless local area network operating to support roaming of station maintained in the same multicast group in accordance with an embodiment of the invention.

Referring now to FIG. 6, an exemplary embodiment of a centralized wireless local area network (WLAN) operating to support the roaming of STA 150 is shown. Herein, STA 150 disassociates from first AP $120_1$ and associates with second AP $120_2$. Wireless network switch 130 detects the new association and, in response, transmits a PROXY IGMP JOIN message 610 to second AP $120_2$ Similar in format to message 165 of FIGS. 1 and 4A, PROXY IGMP JOIN message 610 is designed to cause second AP $120_2$ to join the multicast group or groups to which STA 150 is a member.

In response to PROXY IGMP JOIN message 610, second AP $120_2$ transmits a multicast message 620 to router 140. According to one embodiment of the invention, router 140 extracts the AP MAC address for second AP $120_2$ from multicast message 620, and thereafter, determines if router 140 is aware of the new association between second AP $120_2$ and STA 150, which is a current member of the particular multicast group. If so, router 140 may not need to store the MAC address of second AP $120_2$ and the multicast group address contained within multicast message 620. However, if router 140 is unaware that STA 150 is associated with second AP $120_2$, a new entry would be created so that the AP MAC address and the multicast group address contained within multicast message 620 would be stored in that entry. Thereafter, multicast data streams 630 for a particular multicast group would be routed to second AP $120_2$.

Furthermore, wireless network switch 130 analyzes its data structures to determine whether a PROXY IGMP LEAVE message 640 should be transmitted PROXY IGMP LEAVE message 640 may be necessary if first AP $120_1$ is not associated with any other STAs that belong to the particular multicast group. If first AP $120_1$ is not associated with any other STAs belonging to the same particular multicast group, wireless network switch 130 transmits PROXY IGMP LEAVE message 640 to first AP $120_1$ In response, first AP $120_1$ transmits a multicast message 650 over wired network 110, such as an Ethernet message for example, to multicast router 140.

As a result of this configuration scheme, multicast data streams associated with a multicast group STA 150 are directed and routed to second AP $120_2$ and are discontinued from being sent to first AP $120_1$.

Figure 7:
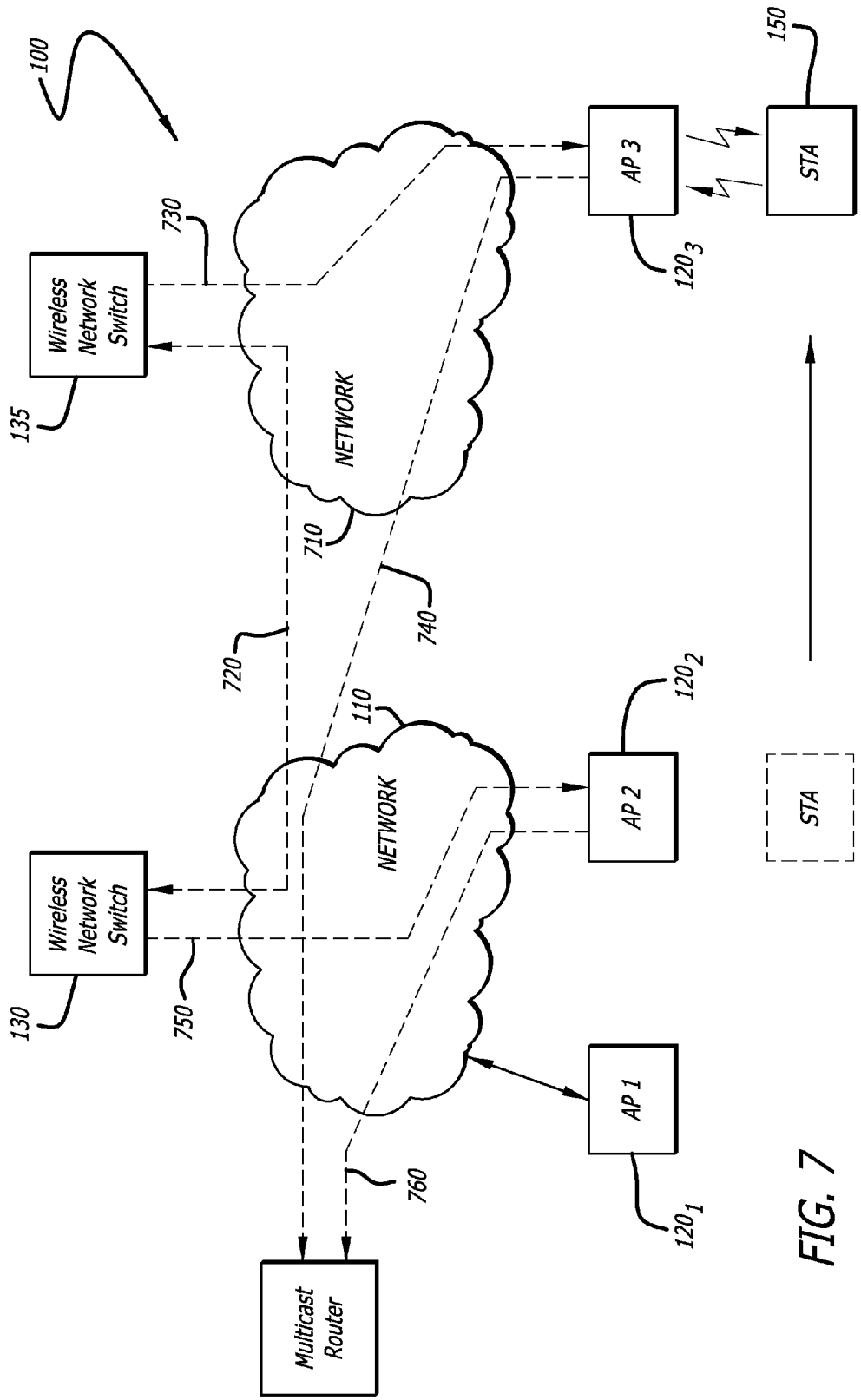
FIG. 7 is an exemplary embodiment of multiple centralized wireless local area networks collectively operating to support maintenance of multicast groups despite roaming of stations between the WLANs.

Referring now to FIG. 7, an exemplary embodiment of centralized wireless local area network to maintain multicast groups despite the roaming of stations over different wired networks is shown. These different wired networks include a first wired network 110 and a second wired network 710. Both wired networks 110 and 710 are L2/L3 networks in communication with router 140; however, wireless network switch 130 controls the multicasting for wired network 110 while wireless network switch 135 controls the multicasting over wired network 710. As illustrated, second wireless network switch 135 is in communication with one or more corresponding access points (e.g., AP $120_3$).

Wireless network switches 130 and 135 may be part of the same WLAN or different WLANs. For either configuration, wireless network switches 130 and 135 are in communication with each other in order to periodically exchange state information concerning multicast group membership for those STAs associated with APs recently controlled by wireless network switch 130. This exchange of state information is represented by data path 720.

More specifically, if wireless network switches 130 and 135 are on the same WLAN, upon detecting that STA 150 has successfully associated with AP $120_3$, wireless network switch 135 sends a query to wireless network switch 130 on behalf of STA 150. This query prompts wireless network switch 130 to provide some or all of its stored content from second table 330 of FIG. 3A for storage into data structures (not shown) within wireless network switch 135. In other words, the relationship between STA 150 and its multicast group membership(s) is provided from wireless network switch 130 to wireless network switch 135.

However, if wireless network switches 130 and 135 are on different WLANs, wireless network switch 135 broadcasts a query that can be received by wireless network switches on the same and different WLANs. The query requests multicast group membership information associated with STA 150.

Based on the received multicast group membership information, wireless network switch 135 knows which multicast groups STA 150 is a member of and transmits appropriate PROXY IGMP JOIN messages 730 to third AP $120_3$. In response, third AP $120_3$ transmits one or more multicast messages 740 to router 140 in order to create entries in its data structures where needed to support multicast data processing. As a result, multicast data streams associated with the multicast groups that STA 150 belong are routed to third AP $120_3$, which disseminates the data streams to wireless stations that are members of this multicast group.

In addition, wireless network switch 130 transmits an IGMP LEAVE message 750 in the event that second AP $120_2$ does not support any other STAs that are members of the multicast groups of which STA 150 belongs. Upon receipt, second AP $120_2$ transmits a message 760 to router 140 where the frame body of message 760 includes information associated with an IGMP LEAVE packet, which forms part of IGMP LEAVE message 750.

Figure 8:
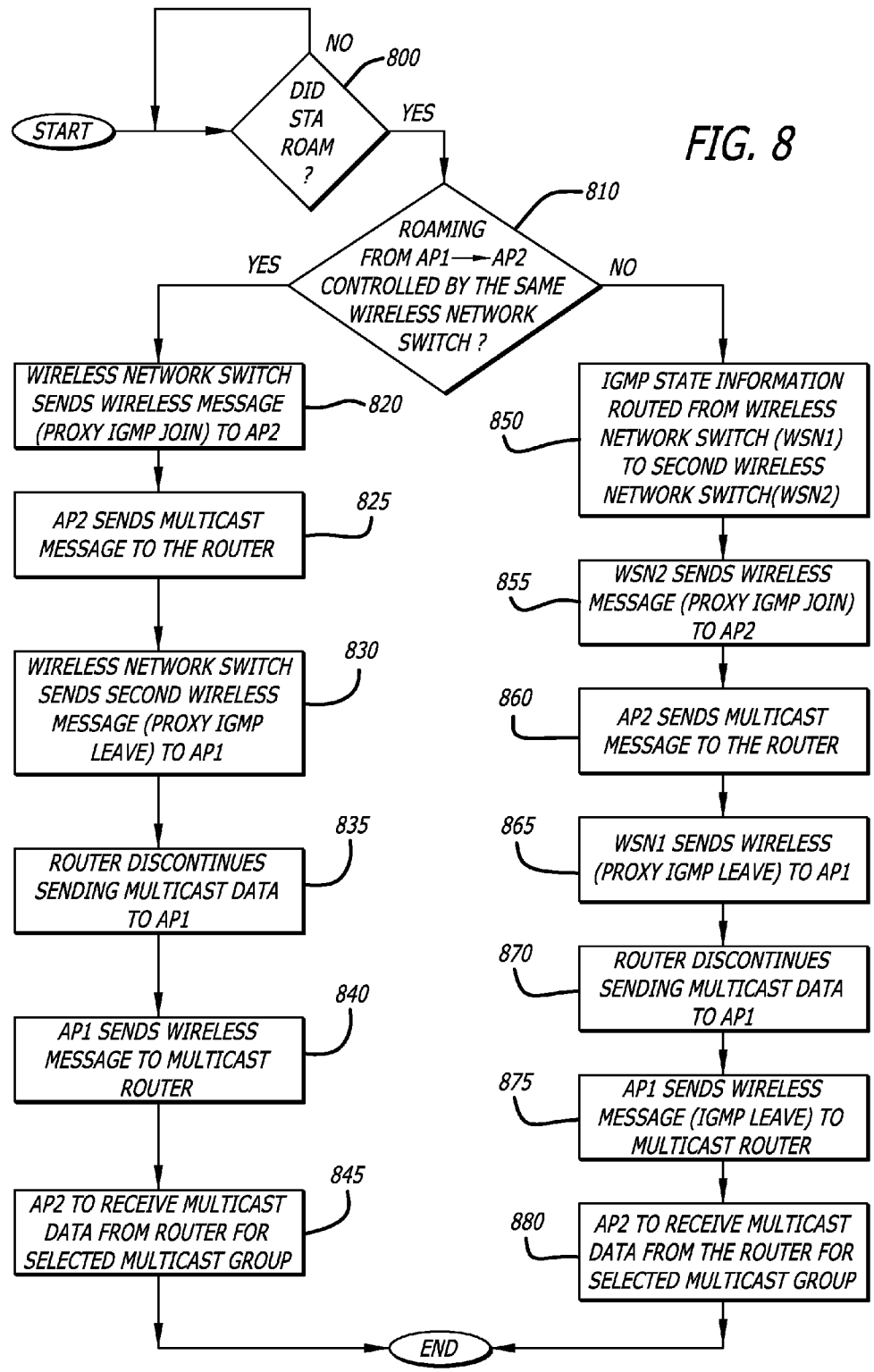
FIG. 8 is an exemplary embodiment of a flowchart for maintaining multicast groups despite roaming of stations between access points of a WLAN and multiple WLANs.

Referring now to FIG. 8, an exemplary embodiment of a flowchart for maintaining multicast groups despite roaming of stations between access points coupled to different wired networks is shown. First, a determination is made whether a STA roamed from a first AP (AP1) to a second AP (AP2) that differs from AP1 (block 800). This determination may be performed by monitoring which STAs, if any, are associated with AP1 and AP2. If the STA has roamed from AP1 to AP2, a determination is made whether AP1 and AP2 are controlled by the same wireless network switch (block 810). This determination is performed in order to discern whether the STA roamed between two APs coupled to different wired networks (and perhaps part of different WLANs altogether).

Upon determining that the STA has roamed from AP1 to AP2 and both of these APs are controlled by the same wireless network switch, the wireless network switch sends a PROXY IGMP JOIN message to AP2 (block 820). AP2 sends a multicast message to router 140. The body of the multicast message includes the IGMP JOIN packet, namely information provided by the PROXY IGMP JOIN message and excluding the STA MAC address information appended to the IGMP JOIN packet (block 825). Hence, if the AP2 becomes a member of the multicast group on behalf of the STA, all multicast communications directed to the multicast group will be routed to AP2 (block 845).

In addition, the wireless network switch sends one or more IGMP LEAVE messages to AP1 in the event that AP1 is not associated with any STAs that belong to the multicast groups that STA belongs (block 830). Thereafter, the multicast router discontinues sending multicast data to AP1 (block 835).

In other words, if STA belongs to two multicast groups (MG1 & MG2) and AP1 is not associated with any STAs belong to these multicast groups, the wireless network switch sends two IGMP LEAVE messages to AP1 directed to "leave" multicast groups MG1 and MG2. If the STA belongs to two multicast groups (MG1 & MG2) and AP1 is associated with a STA that is a member of MG1 but is not associated with any STAs belonging to MG2, wireless network switch sends an IGMP LEAVE message to AP1 directed to "leave" multicast group MG2.

Upon receipt of an IGMP LEAVE message, AP1 sends a multicast message to router 140 (block 840). The multicast message requests removal of AP1 from the multicast group identified in the IGMP LEAVE packet inserted into the body of the multicast message. Upon detection that the multicast message includes an IGMP LEAVE packet, the router removes AP1 as a proxy for STAs from the multicast group(s).

Alternatively, upon determining that the STA has roamed from AP1 to AP2, where AP1 is controlled by a first wireless network switch (WNS1) and AP2 is controlled by a second wireless network (WNS2), IGMP state information is routed from WNS1 to WNS2 (block 850). Thereafter, WNS2 sends a PROXY IGMP JOIN message to AP2 (block 855). AP2 sends a multicast message to router 140 (block 860). Hence, if the STA becomes a member of the multicast group, all multicast communications directed to the multicast group will be routed to AP2 (block 880).

In addition, WSN1 sends one or more IGMP LEAVE messages to AP1 in the event that AP1 is not associated with any STAs that belong to the same multicast group as STA (block 860). Upon receipt of an IGMP LEAVE message, AP1 sends a multicast message to the router and discontinues receiving the multicast data from router (blocks 870 and 875). The multicast message requests removal of AP1 from the multicast group identified in the IGMP LEAVE packet that is inserted into the body of the multicast message. Upon detection that the multicast message includes an IGMP LEAVE packet, the router removes AP1 as a proxy for STAs being members of that multicast group.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
   receiving, by a first access point, a first message comprising a first request for a wireless station to join a multicast group associated with a multicast group address;
   responsive to receiving the first request to join the multicast group, transmitting, to a particular network device, a second message comprising:
   (a) the multicast group address; and
   (b) one or more of: an identification of the wireless station and an identification of the first access point;
   transmitting a third message, for joining the multicast group, to a multicast router without routing of the third message via the particular network device, the third message being addressed to the multicast group address;
   receiving multicast data, from the multicast router, without the multicast data being routed through the particular network device.

2. The method of claim 1, wherein the second message comprises a second request to join the multicast group.

3. The method of claim 1, wherein the first message encapsulates an Internet Group Management Protocol (IGMP) JOIN message.

4. The method of claim 2, wherein the third message comprises a second request to join a multicast group corresponding to the multicast group address.

5. The method of claim 1, wherein the particular network device is a wireless network switch implemented within a wireless local area network that includes the first access point.

6. The method of claim 1 or 2, wherein the third message is transmitted based on instructions received, from the particular network device, in response to transmitting the second message to the particular network device.

7. The method of claim 1, further comprising:
   subsequent to the wireless station associating with a second access point:
   transmitting, by the particular network device to the second access point, a fourth message that causes the second access point to transmit a message comprising a request to join a multicast group corresponding to the multicast group address;
   wherein the multicast data from the multicast router is received by the second access point without the multicast data being routed through the particular network device.

8. A method comprising:
   subsequent to a wireless station associating with a first access point: receiving, by a network device, a first message comprising a multicast group address and an identification of the wireless station;
   wherein multicast data, associated with the multicast group address, is transmitted from a multicast router to the wireless station via the first access point without being routed through the network device;
   responsive to the wireless station associating with a second access point: transmitting, by the network device to the second access point, a second message comprising the multicast group address and the identification of the wireless station;
   wherein the multicast data, associated with the multicast group address, is transmitted from the multicast router to the wireless station via the second access point without being routed through the network device.

9. The method of claim 8, wherein the first message comprises a request to join a multicast group corresponding to the multicast group address.

10. A method comprising:
    subsequent to a wireless station associating with an access point: receiving, by a network device from the access point, a first message comprising a request to join a multicast group corresponding to a multicast group address;
    responsive to receiving the first message: transmitting, by the network device to the access point, a second message which causes the access point to transmit a third message to a multicast router without being routed via the network device, the third message comprising the request to join the multicast group corresponding to the multicast group address;

wherein the wireless station receives multicast data, associated with the multicast group, from the multicast router via the access point without the multicast data being routed via the network device.

11. The method of claim 10, wherein the network device is a wireless network switch implemented within a wireless local area network that includes the wireless station.

12. The method of claim 1, wherein the first message was transmitted, by a particular wireless station associated with the multicast group membership information, while the particular wireless station was associated with a first access point, the method further comprising:

subsequent to the particular wireless station associating with a second access point:

transmitting, by the particular network device to the second access point, instructions to join a group associated with the multicast group address;

based on the instructions, transmitting, by the second access point, a fourth message to the multicast router without routing of the message via the particular network device, the fourth message being addressed to the multicast group address.

13. The method of claim 9, wherein the second message encapsulates the request to join the multicast group corresponding to the multicast group address.

14. One or more non-transitory computer readable mediums comprising instructions which, when executed by one or more processors, cause performance of:

receiving, by a first access point, a first message comprising a first request for a wireless station to join a multicast group associated with a multicast group address;

responsive to receiving the first request to join the multicast group, transmitting, to a particular network device, a second message comprising:
(a) the multicast group address; and
(b) one or more of: an identification of the wireless station and an identification of the first access point;

transmitting a third message, for joining the multicast group, to a multicast router without routing of the third message via the particular network device, the third message being addressed to the multicast group address;

receiving multicast data, from the multicast router, without the multicast data being routed through the particular network device.

15. The one or more computer readable mediums of claim 14, wherein the second message comprises a second request to join the multicast group.

16. The one or more computer readable mediums of claim 15, wherein the third message comprises a second request to join a multicast group corresponding to the multicast group address.

17. The one or more computer readable mediums of claim 14 or 15, wherein the third message is transmitted based on instructions received, from the particular network device, in response to transmitting the second message to the particular network device.

18. The one or more computer readable mediums of claim 14, wherein the first message encapsulates an Internet Group Management Protocol (IGMP) JOIN message.

19. The one or more computer readable mediums of claim 14, wherein the particular network device is a wireless network switch implemented within a wireless local area network that includes the first access point.

20. The one or more computer readable mediums of claim 14, wherein the instructions which, when executed by one or more processors, further perform operations comprising:

subsequent to the wireless station associating with a second access point:

transmitting, by the particular network device to the second access point, a fourth message that causes the second access point to transmit a message comprising a request to join a multicast group corresponding to the multicast group address;

wherein the multicast data from the multicast router is received by the second access point without the multicast data being routed through the particular network device.

21. The one or more computer readable mediums of claim 14, wherein the first message was transmitted, by a particular wireless station associated with the multicast group membership information, while the particular wireless station was associated with a first access point, the instructions which, when executed by one or more processors further perform operations comprising:

subsequent to the particular wireless station associating with a second access point:

transmitting, by the particular network device to the second access point, instructions to join a group associated with the multicast group address;

based on the instructions, transmitting, by the second access point, a fourth message to the multicast router without routing of the message via the particular network device, the fourth message being addressed to the multicast group address.

22. A non-transitory computer readable medium comprising instructions which, when executed by one or more processors cause performance of:

subsequent to a wireless station associating with a first access point: receiving, by a network device, a first message comprising a multicast group address and an identification of the wireless station;

wherein multicast data, associated with the multicast group address, is transmitted from a multicast router to the wireless station via the first access point without being routed through the network device;

responsive to the wireless station associating with a second access point: transmitting, by the network device to the second access point, a second message comprising the multicast group address and the identification of the wireless station;

wherein the multicast data, associated with the multicast group address, is transmitted from the multicast router to the wireless station via the second access point without being routed through the network device.

23. The computer readable medium of claim 22, wherein the first message comprises a request to join a multicast group corresponding to the multicast group address.

24. The computer readable medium of claim 23, wherein the second message encapsulates the request to join the multicast group corresponding to the multicast group address.

25. A non-transitory computer readable medium comprising instructions which, when executed by one or more processors cause performance of:

subsequent to a wireless station associating with an access point: receiving, by a network device from the access point, a first message comprising a request to join a multicast group corresponding to a multicast group address;

responsive to receiving the first message: transmitting, by the network device to the access point, a second message which causes the access point to transmit a third message to a multicast router without being routed via the network device, the third message comprising the request to join the multicast group corresponding to the multicast group address;

wherein the wireless station receives multicast data, associated with the multicast group, from the multicast router via the access point without the multicast data being routed via the network device.

26. The computer readable medium of claim 25, wherein the network device is a wireless network switch implemented within a wireless local area network that includes the wireless station.

\* \* \* \* \*